(12) United States Patent
Huang et al.

(10) Patent No.: US 10,578,222 B2
(45) Date of Patent: Mar. 3, 2020

(54) MULTI-BUTTON WATERWAY SWITCHING MECHANISM

(71) Applicant: XIAMEN SOLEX HIGH-TECH INDUSTRIES CO., LTD., Xiamen, Fujian (CN)

(72) Inventors: Xi Huang, Fujian (CN); Mingfu Zhang, Fujian (CN); Weilong Luo, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 59 days.

(21) Appl. No.: 16/026,924

(22) Filed: Jul. 3, 2018

(65) Prior Publication Data
US 2019/0162321 A1    May 30, 2019

(30) Foreign Application Priority Data

Nov. 24, 2017   (CN) .......................... 2017 1 1190633

(51) Int. Cl.
| | |
|---|---|
| *F16K 11/20* | (2006.01) |
| *B05B 1/18* | (2006.01) |
| *F16K 11/22* | (2006.01) |
| *E03C 1/04* | (2006.01) |

(52) U.S. Cl.
CPC ................ *F16K 11/20* (2013.01); *B05B 1/18* (2013.01); *E03C 1/0408* (2013.01); *F16K 11/22* (2013.01); *Y10T 137/87113* (2015.04)

(58) Field of Classification Search
USPC ...................................................... 137/637.1
See application file for complete search history.

(56) References Cited

U.S. PATENT DOCUMENTS

| | | | | |
|---|---|---|---|---|
| 3,348,577 A | * | 10/1967 | Miller | ............... F16K 31/52416 |
| | | | | 137/637.1 |
| 2005/0224406 A1 | * | 10/2005 | Takagi | ...................... B05B 1/16 |
| | | | | 210/424 |
| 2016/0238144 A1 | * | 8/2016 | Peel | .......................... F17D 1/00 |

FOREIGN PATENT DOCUMENTS

| | | |
|---|---|---|
| CN | 201053519 | 4/2008 |
| CN | 101982242 | 3/2011 |

* cited by examiner

*Primary Examiner* — John Fox
(74) *Attorney, Agent, or Firm* — Rabin & Berdo, P.C.

(57) ABSTRACT

A multi-button waterway switching mechanism includes a fixed portion provided with a waterway switching unit and a driving mechanism. The waterway switching unit includes two valve cores that can move relative to the fixed portion, and the driving mechanism is provided with three buttons spaced side by side and parallel to the sliding direction of the fixed portion, the three buttons are divided into two first button and a second button, the two first button respectively drivingly connected to the two valve cores, the driving mechanism further comprises a transmission member, the second button drivingly connects the transmission member, and the transmission member drivingly connected to the two valve cores.

11 Claims, 9 Drawing Sheets

MULTI-BUTTON WATERWAY SWITCHING MECHANISM

TECHNICAL FIELD

The present invention relates to a waterway switching mechanism, and more particularly to a multi-button waterway switching mechanism.

BACKGROUND TECHNIQUE

The existing multi-button waterway switching mechanism, such as CN201053519Y, includes a fixed portion provided with a waterway switching unit and a driving mechanism. The waterway switching unit includes two valve cores that can move relative to the fixed portion, and the waterway switching unit comprises two valve cores which are capable of moving relative to the fixed portion, and the driving mechanism is provided with two buttons which are arranged side by side and parallel to the sliding direction of the fixed part. The driving mechanism further comprises a seesaw, the middle of the seesaw can be swingably connected with the fixed unit, the two buttons respectively abutting the two ends of the seesaw, the two ends of the seesaw respectively abut against the valve core. The button is pressed and abut against the seesaw, driving the seesaw swing, abutting against a valve core to achieve switching. The switching mechanism has the following deficiencies: First, the two valve cores can only be driven to slide alternatively, and the two valve cores can not be driven to slide synchronously at the same time. Therefore, the two water diversion channel corresponding valve cores can not be opened and discharge water at the same time.

In view of the above shortcomings, a solution has been proposed, such as CN101982242A, which comprises a fixed portion provided with a waterway switching unit and a driving mechanism. The waterway switching unit comprises two valve cores which can move relative to the fixed portion, three buttons are arranged spacely side by side and parallel to the sliding direction of the fixed portion. The three buttons are divided into two first buttons and a second button. The two first buttons are respectively drivingly connected to the two valve cores to drive the valve core to slide through the sliding of the first button to switch. The second valve is drivingly connected to the two first buttons to press the second button to reset the two first buttons. The switching mechanism has the following deficiencies: the second button acts as a reset, there is no transmission connected to the valve core, and the two valve cores can not be driven to slide synchronously at the same time. In order to drive the two valve cores at the same time, the two first buttons need to be pressed at the same time, which is inconvenient to press.

CONTENT OF THE INVENTION

The present invention provides a multi-button waterway switching mechanism that overcomes the deficiencies of the multi-button waterway switching mechanism of the background art.

The technical solution adopted by the present invention to solve the technical problem is as follows:

A multi-button waterway switching mechanism comprising a fixed portion provided with a waterway switching unit and a driving mechanism, the waterway switching unit comprises two valve cores movable relative to the fixed portion, the driving mechanism is provided with three buttons at intervals, the three buttons are divided into two first buttons and a second button, the two first buttons are respectively drivingly connected with the two valve cores, and the driving mechanism further comprises a transmission member, the second button is drivingly connected to the transmission member, the transmission member drivingly connected to the two valve cores.

In an embodiment, the three buttons are arranged side by side and parallel to the sliding direction of the fixed portion.

In an embodiment, the valve core is slidably connected with the fixed portion, and a first elastic body capable of resetting the valve core is provided between the valve core and the fixed portion; the first button and the valve core can be brought into abutting engagement to drive the abutted valve core to slide by the sliding of the first button; the transmission member is slidably connected with the fixed portion, the second button and the transmission member can be brought into abutting engagement to drives the transmission member to slide by the sliding of the second button, and the transmission member and the two valve cores can abut against each other to drive the two valve cores to slide synchronously by the sliding of the transmission member.

In an embodiment, the two first buttons are respectively disposed on two sides of the second button, the transmission member has two abutting portions, and the two abutting portions respectively transmit two valve cores.

In an embodiment, the valve core sliding direction, the button's sliding direction and the transmission member's sliding direction are parallel to each other.

In an embodiment, the fixed portion is provided with a waterway inlet and two water diversion channels respectively capable of connecting with the waterway inlet, and the two valve cores are respectively slidably connected to the two water diversion channels and controls the on-off between the water diversion channel and the waterway inlet by the sliding of the valve, the first end of the valve core also seals and slides out of the water diversion channel, the first elastomer is arranged between the second end of the valve core and the fixed portion for enabling the valve core to be reset.

In an embodiment, the fixed portion is provided with a waterway inlet and two water diversion channel capable of respectively connecting to the waterway inlet, the two valve cores are respectively slidably connected to the two water diversion channel and controls the on-off between the water diversion channel and the waterway inlet by the sliding of the valve, the fixed portion is provided with two mounting holes respectively connected to the two water diversion channel, and the first end of the valve core also seals and is slidably connected to the mounting hole; the fixed portion is slidably connected with two sleeves which are stepped and have a large diameter portion and a small diameter portion, the small diameter portion can be inserted into the mounting hole and abuts against the first end of the valve core, The first button end and the large diameter portion can abut against each other, and the transmission member and the large diameter portion can abut against each other.

In an embodiment, the two first buttons are respectively disposed on two sides of the second button, the transmission member has two abutting portions, and the two abutting portions respectively drive two valve cores; the large diameter portion has two side portions respectively located on both sides of the inner hole of the sleeve, and the first button and the abutting portion respectively abut against the two side portions.

In an embodiment, the waterway switching mechanism further comprising a slider and a second elastic body, wherein the slider can move relative to the fixed portion between the locking position and the releasing position, the slider's sliding direction and the button's sliding direction is arranged vertically, the second elastic body is connected to the fixed portion and the slider so that the slider can be subjected to the elastic force from the release position toward the locking position; the slider is provided with three through holes, the three buttons respectively pass through the three through holes; each of the buttons is provided with a first protrusion, the back surface of the first protrusion is a first guide surface, and the first guide surface and the slider are matched so that the slider can be driven to slide to the unlocking direction when the button is pressed, and the front surface of the first protrusion forms a locking surface capable of pressing against the slider to keep the button in the pressed state.

In an embodiment, each of the buttons is provided with a second protrusion, and the second protrusion and the first protrusion are arranged in the front and back direction of the button, the back surface of the second protrusion is a second guiding surface. The second guiding surface cooperates with the slider so that when the button is pressed, the slider can be driven to slide to the unlocking direction.

In an embodiment, the distance of the second guide surface along the sliding direction of the slider is greater than the distance of the first guide surface along the sliding direction of the slider.

Compared with the background art, this technical solution has the following advantages:

When the first button is pressed, the valve core corresponding to the first button can be driven, and when the second button is pressed, the two valve cores can be driven synchronously by the transmission member, no matter only one valve cores is driven (press the first button), or synchronously two valve cores are driven (press the second button), it is just need to press one button, which is fast and easy.

The first button and the valve core can abut against each other to drive the abutting valve core to slide by the sliding of the first button, the transmission member is slidably connected to the fixed portion, the second button and the transmission member can be brought into abutment engagement and to drive the transmission member to slide by the sliding of the second button, the transmission member and the two valve cores can abut against each other to drive the two valve cores to slide synchronously by the sliding of the transmission member. The utility model has the advantages of simple structure, rational layout, compact structure and stable and reliable transmission.

The two first buttons are respectively arranged on two sides of the second button, and the transmission member has two abutting portions, the two abutting portions respectively drive the two valve cores, and the layout is reasonable and the structure is compact.

The valve core's sliding direction, the button's sliding direction are parallel to the sliding direction of the transmission member, the structure is simple, the transmission is stable and reliable.

The first end of the valve core also seals and is slidably connected to the mounting hole, the fixed portion is slidably connected with the two sleeves, the sleeve is stepped and has a large diameter portion and a small diameter portion, the small diameter portion can be inserted into the mounting hole and abut against the first end of the valve core, the large-diameter portion and the end of the first button can abut against each other, the transmission member and the large diameter portion can abut against each other, the first button abuts against the valve core through the sleeve, and the transmission member also abuts against the valve core through the sleeve, on the one hand, the guidance of sliding is improved, on the other hand, it is convenient that the transmission member and the first button abut against each other.

The large diameter portion has two side portions respectively located at two sides of the inner hole of the sleeve. The first button and the abutting portion respectively abut against the two side portions to facilitate the transmission member and the first button to abut against each other. The layout is reasonable and the structure is compact.

Further comprising a slider and a second elastic body, each of the buttons is provided with a first protrusion, the back surface of the first protrusion is a first guide surface, the first guide surface and the slider cooperate so that when the button is pressed and it can drive the slider to slide to the unlocking direction, and the front surface of the first protrusion is configured to a sealing surface that can abut against the the slider so as to keep the button in the pressed state. Pressing any button can keep the button in the pressed state, and can keep the other button to release from the pressed state.

Each button is provided with a second protrusion, the second protrusion and the first protrusion are arranged along the back of the button, the back of the second protrusion is a second guide surface, and the second guide surface is matched with the slider so that the slider can be driven to slide to the unlocking direction when the button is pressed. If the three buttons are accidentally pressed at the same time and enter the pressed state, the user can press any button again to release the other buttons from being pressed through the second guide surface, avoiding the lock phenomenon by accidentally press.

BRIEF DESCRIPTION OF THE DRAWINGS

The present invention will be further described below with reference to the accompanying drawings and embodiments.

DETAILED DESCRIPTION

Please refer to FIG. 1 to FIG. 10, in the present embodiment, the multi-button waterway switching mechanism includes a fixed portion 10 provided with a waterway switching unit 20 and a drive mechanism 30. The waterway switching unit 20 comprises a waterway inlet 21 and two water diversion channels 22 respectively connected to the waterway inlet 21. Each water diversion channel 22 is connected with a valve core 23 that can slide relative to the fixed portion 10, the sliding of the valve core 23 controls whether the water diversion channel 22 is connected to the waterway inlet 21, and between the valve core 23 and the fixed portion 10 is provided with a first elastic body 24 which can reset the valve core 23. The driving mechanism 30 is provided with three buttons which are arranged side by side in the left-right direction and parallel to the sliding direction of the fixed portion 10 and a transmission member 33 which is slidably connected with the fixed portion 10. The three buttons are divided into two first buttons 31 and a second button 32. The two first buttons 31 are respectively drivingly connected to the two valve cores 23. The second button 32 is drivingly connected to the transmission member 33, and the transmission member 33 is drivingly connected to the two valve cores 23. The sliding direction of the valve core 23, the sliding direction of the buttons 31 and 32 are parallel to the sliding direction of the transmission member 33.

Figure 1:
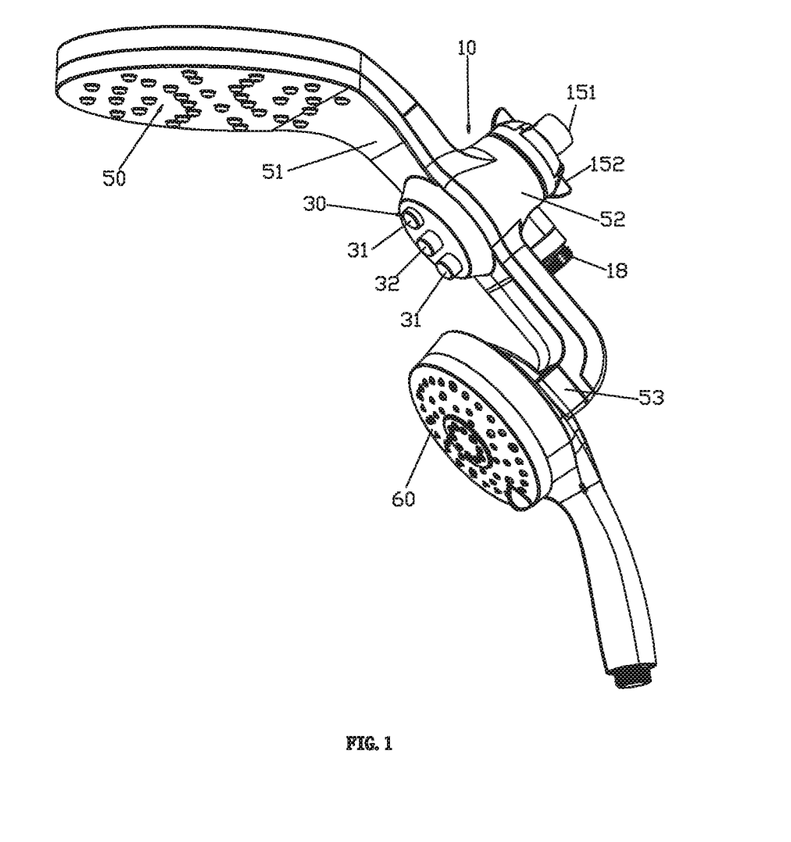
FIG. 1 is a three-dimensional structure diagram of the shower of the present embodiment.
Figure 2:
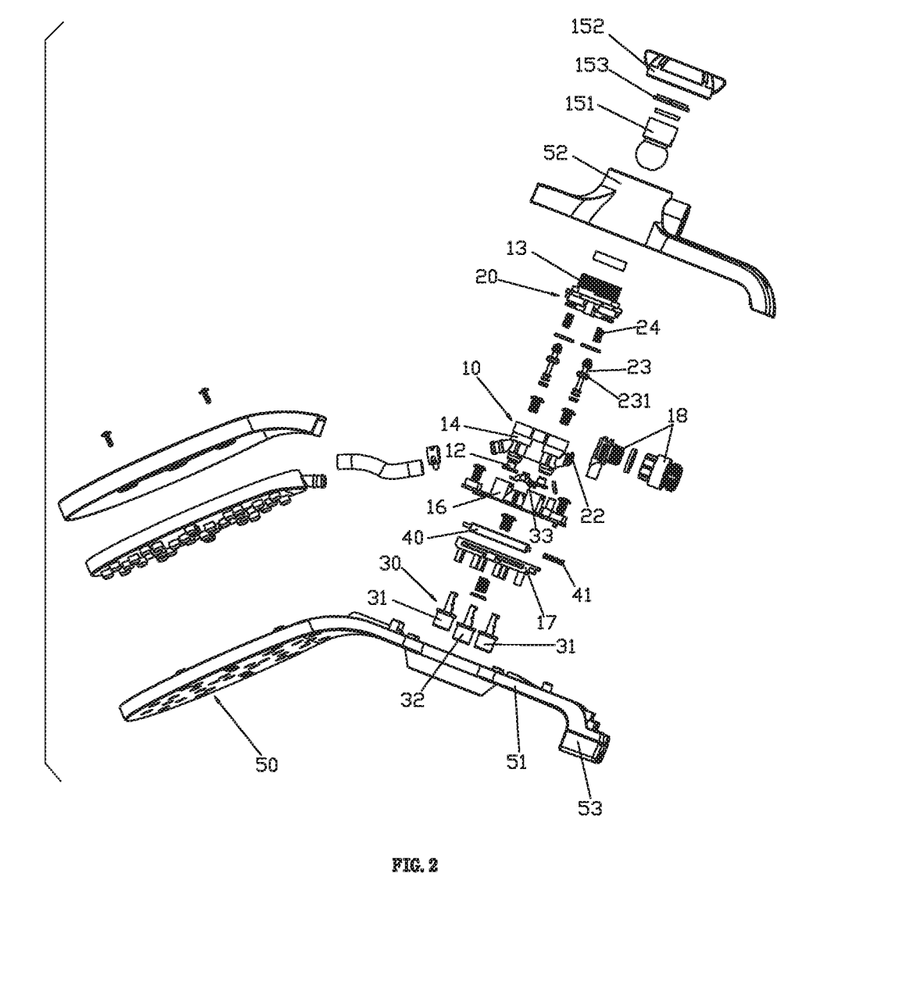
FIG. 2 is an exploded perspective view of the shower of the present embodiment.
Figure 3:
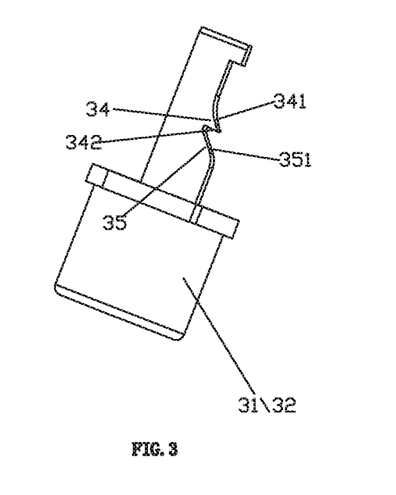
FIG. 3 is the first cross-sectional views of the shower of the present embodiment.
Figure 4:
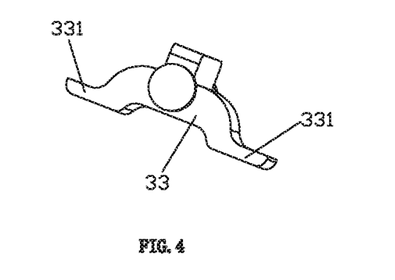
FIG. 4 is the second cross-sectional view of the shower of the present embodiment.
Figure 5:
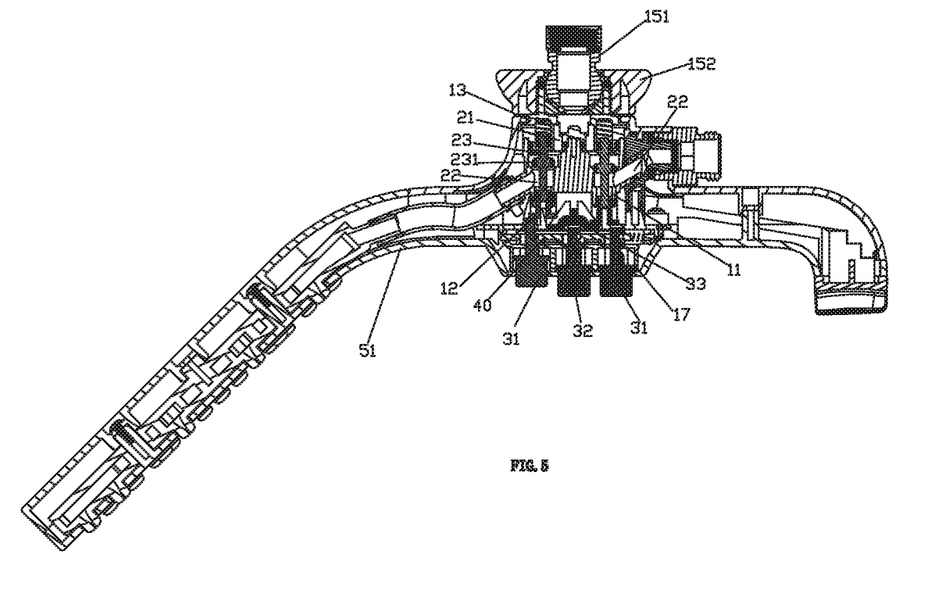
FIG. 5 is a three-dimensional schematic diagram of the button of the shower of the present embodiment.
Figure 6:
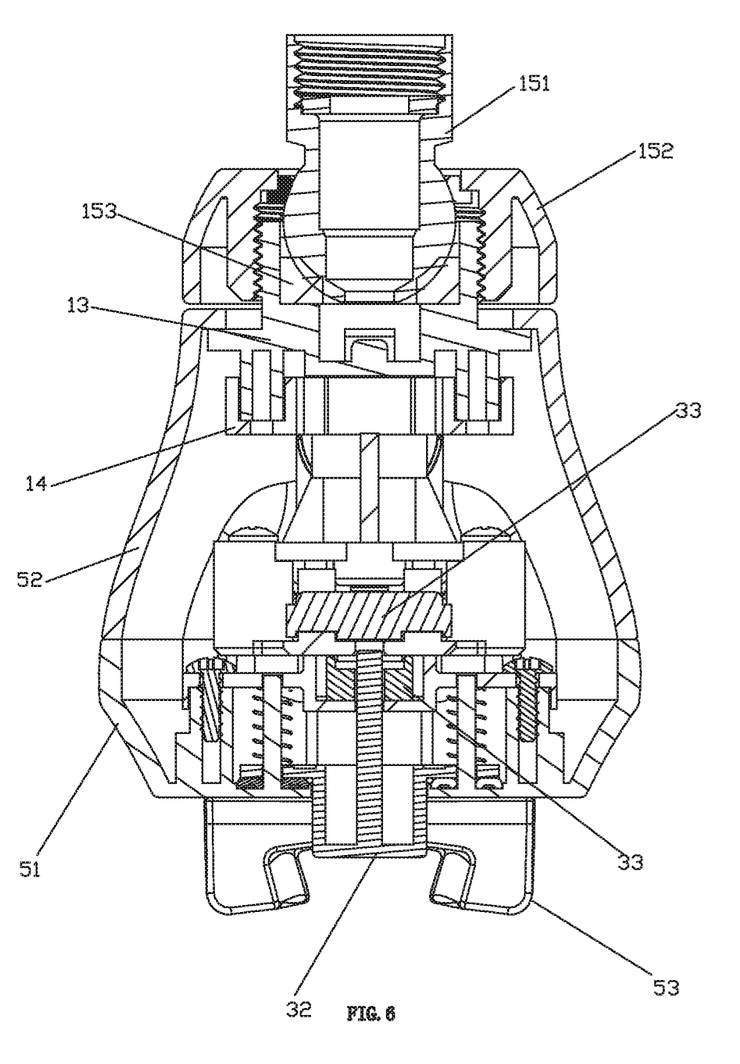
FIG. 6 is a three-dimensional schematic diagram of the transmission member of the shower of the present embodiment.
Figure 7:
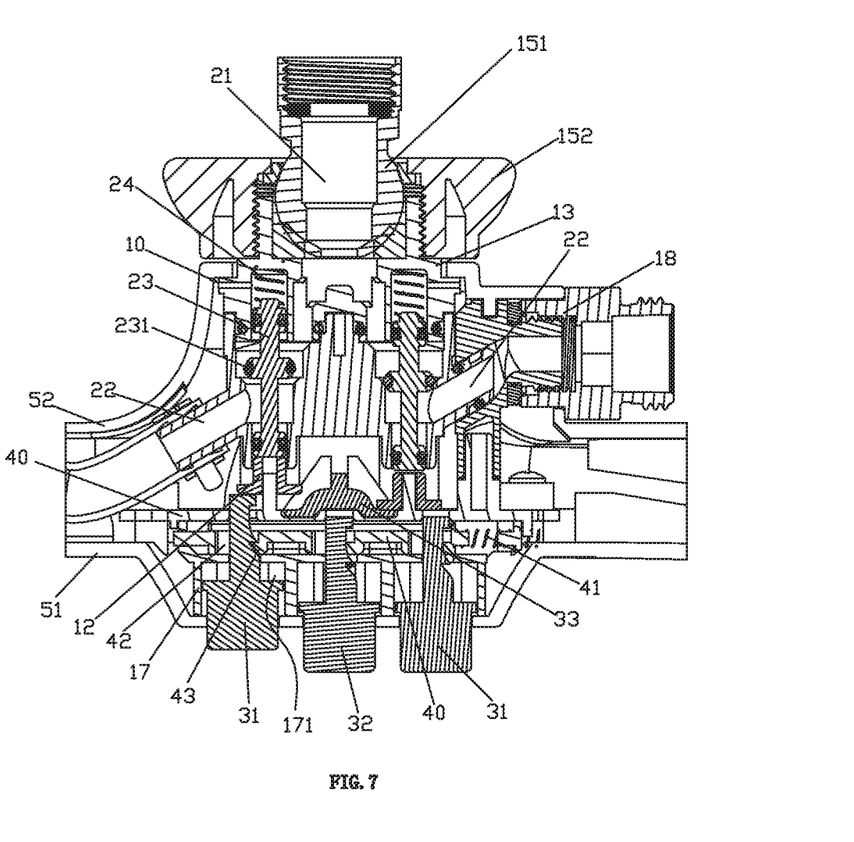
FIG. 7 is a schematic cross-sectional view of the switching mechanism of the present embodiment, at this time the first button is pressed, the first water diversion channel is opened.
Figure 8:
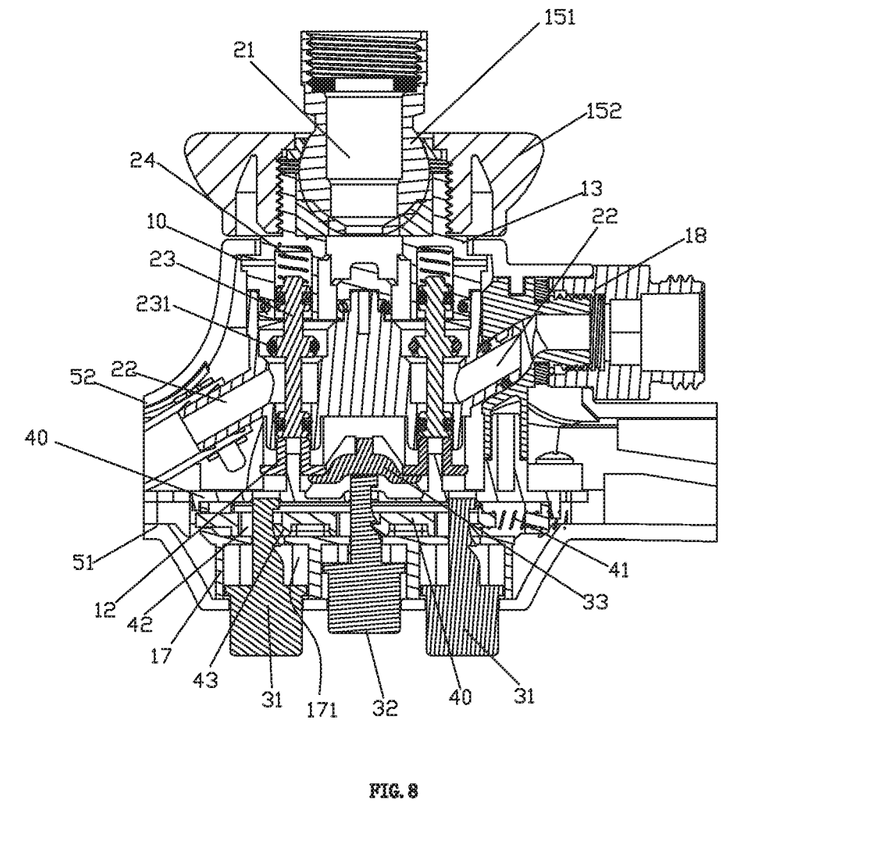
FIG. 8 is a schematic cross-sectional view of the switching mechanism of the present embodiment, at this time, the second button is pressed, and the first and second water diversion channels of the shower are opened at the same time.
Figure 9:
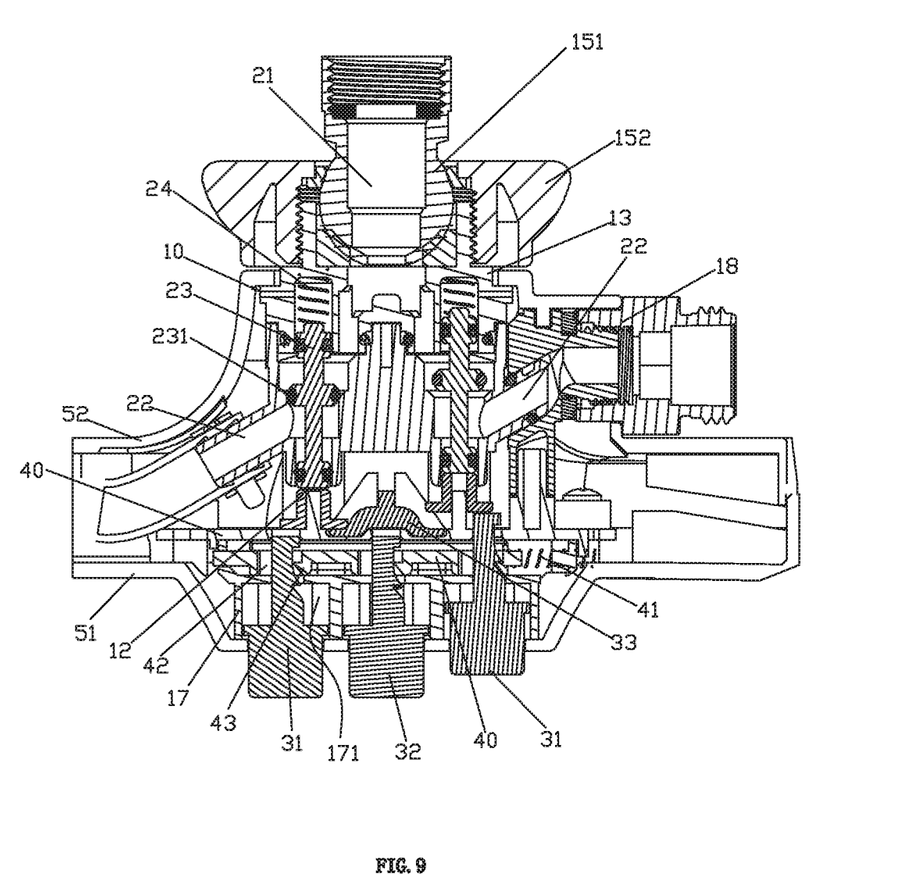
FIG. 9 is a schematic cross-sectional view of the switching mechanism of the present embodiment, at this time, another first button is pressed and the second water diversion channel of the shower is opened.
Figure 10:
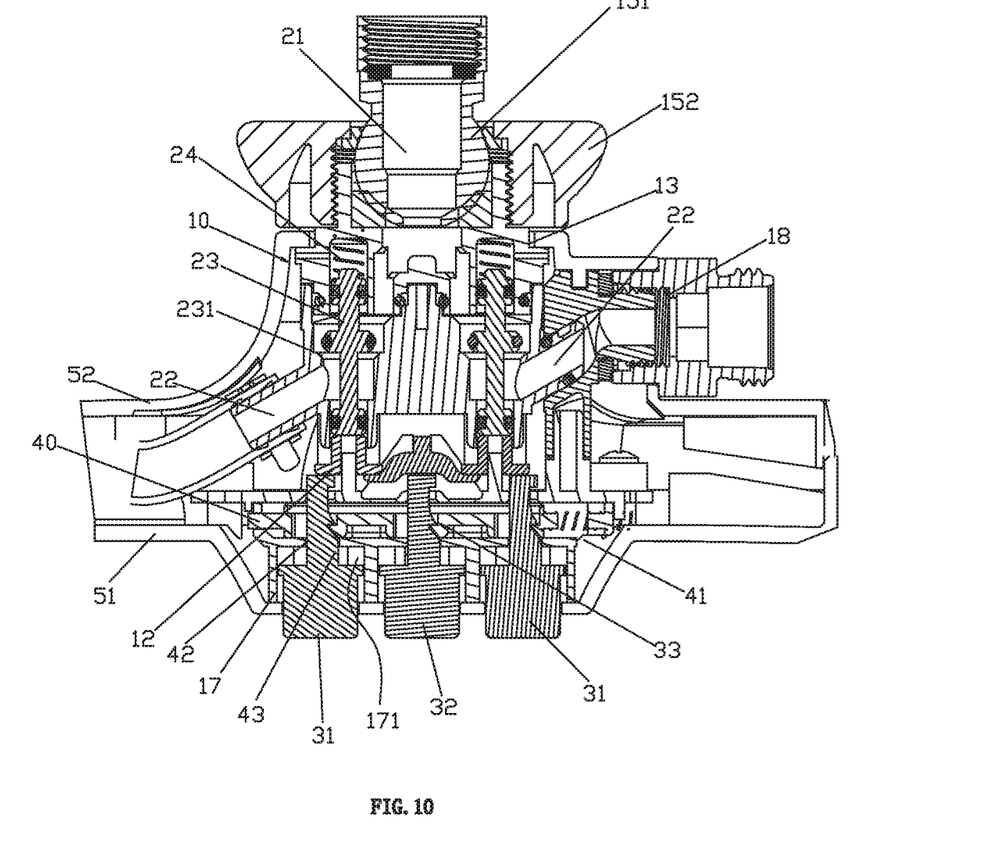
FIG. 10 is a schematic cross-sectional view of the switching mechanism of the present embodiment, at this time, the three buttons are simultaneously pressed accidentally.

In this embodiment, the two first buttons 31 are respectively disposed on two sides of the second button 32, and the transmission member 33 has two abutting portions 331 arranged on the left and right sides. The first button 31 and the valve core 23 can abut against each other to drive the abutting valve core 23 by the sliding of the first button 31, so as to open the water diversion channel 22 corresponding the valve core 23, and the water diversion channel 22 discharge water as shown in FIG. 7 and FIG. 9. At this time, the first elastic body 24 corresponding valve core 23 is in compression; the second button 32 and the transmission member 33 can abut against each other to drive the transmission member 33 to slide by the sliding of the second button 32; and the two abutting portions 331 and two the valve core 23 respectively can abut against each other to drive the two valve cores 23 to slide synchronously by the sliding of the transmission member 33 to open the two water diversion channels 22, and the two water diversion channels 22 discharge water at the same time, as shown in FIG. 8, at this time, the two second elastic bodies 14 are at energy storage state.

In a specific structure, the fixed portion 10 is provided with two mounting holes 11 respectively connected to the water diversion channel 22, the first end of the valve core 23 seals and is slidably connected to the mounting hole 11, and the first elastic body 24 is disposed on between the second end of the core 23 and the fixed portion 10; the fixed portion 10 is slidably connected to two sleeves 12, the sleeves are stepped and have a large diameter portion and a small diameter portion, the small diameter portion can be inserted into the mounting hole 11 and abut against the first end of the valve core 23, and the large diameter portion has two side portions respectively located on two sides of the inner hole of the sleeve. The end of the first button 31 and one side portion of the large diameter portion of the sleeve 12 can abut against each other. The abutting portion 331 of the transmission member 33 and the other side portion of the large diameter portion can abut against each other.

In this embodiment, a slider 40 and a second elastic body 41 are further included, and the slider 40 can slide relative to the fixed portion 10 between the locking position and the releasing position. The sliding direction of the slider 40 and the sliding direction of the buttons 31 and 32 are perpendicular. The sliding direction of the slider 40 is the same as the spacing direction of the three buttons 31, 32, such as right-left direction in figure. The second elastic body 41 connects the fixed portion 10 and the slider 40 to make the slider 40 be subjected to the elastic force from the release position toward the locked position; the slider 40 is provided with three through holes 42, the buttons 31, 32 respectively are through the three through holes 42; each of the buttons 31, 32 are provided with a first protrusion 34 which has a first guiding surface 341 at a back surface thereof. The first guiding surface 341 cooperates with the slider 40 to push the slider 40 to slide to the unlocking direction when the button 31 or 32 is pressed. The front surface of the first protrusion 34 is configured to be a locking surface 342 abutting against the slider 40 to keep the button in a pressed state. In a specific structure, each button 31, 32 is provided with a second protrusion 35, the second protrusion 35 and the first protrusion 34 arranged along the front back of the button 31, 32. the back of the second protrusion 35 is a second guiding surface 351. The second guiding surface 351 cooperates with the slider 40 so as to push the slider 40 to slide in the unlocking direction when the button 31 or 32 is pressed, and if three buttons are accidentally pressed at the same time and enter press the state, as shown in FIG. 10, press any button again, through the second guide surface to release the other buttons from pressed state, to avoid locking phenomenon occurs due to accidental press; the distance of the second guide surface along the slider's sliding direction is larger than the distance of the first guiding surface along the sliding direction of the slider, and ensures the pressing state such as pressing against other buttons once again. The through hole 42 of the slider 40 is convexly provided with a hooking portion 43 which is provided with a third guiding Surface, the first guide surface and the third guide surface can cooperate with each other, and the second guide surface and the third guide surface also cooperate with each other to further ensure that the first protrusion and the second protrusion can abut against the slider to drive the slider to slide to the unlocking position; the hooking portion 43 is also matched with the locking surface to lock the button 31 or 32.

In the specific structure, the fixed portion 10 includes a connecting seat 13 and a water diversion body 14. The connecting seat 13 includes an annular portion and a central portion fixed by a spoke in the annular portion, The water diversion body 14 is provided with the above-mentioned water diversion channel 22, the one water diversion channel 22 has a water-diversion hole portion and a water-passing channel 221 for connecting the water diversion hole portion; and the water diversion body 14 and the connection seat 13 are fixedly and tightly connected together. The water diversion body 14 and the annular portion are spaced to form an on-off cavity which also forms a portion of the waterway inlet 21 which is communicated with the inner hole of the annular portion by the spacing between two adjacent spokes. The water dividing hole of the water diversion body 14 is further provided with the mounting hole 11 which is communicated to the outer wall of the diversion body 14 as described above and the annular portion of the connecting seat 13 is also provided with a concave groove corresponding to the end surface of the on-off cavity. The first sealing portion 231 is fixedly connected to the valve core 23. The first sealing portion 231 is sealed against the water diversion hole portion to disconnect the water diversion channel 22 and the on-off cavity, or the first sealing portion 231 is far away from the water diversion hole portion 12 to connect the water diversion channel 22 and the on-off cavity. and the second end of the valve core 23 is fixed with the second sealing portion The second sealing portion of the valve core 23 seals and is slidably connected in the groove, the first elastic body 24 is located in the groove and abuts the groove bottom of the groove and the second end of the valve core 23; A third sealing portion is externally fixed to the first end portion of the valve core 23, and the third sealing portion seals and is slidably connected to the mounting hole 11.

In the specific structure, the fixed portion 10 further includes a first shower portion 50 and a second shower portion 60. The first shower portion 50 has a lower body 51 and an upper body 52. The upper body 51 and the lower body 52 is fixed to form a mounting space, the connecting seat 13 and the water diversion body 14 are fixedly disposed in the mounting space, the connecting seat 13 extends over the body 52, and the protruding portion of the connecting seat 13 through the ball joint 151, the nut 152 and the spherical washer 153 is attached to the water supply so that the water can be delivered to the waterway inlet. The lower body 51 is also provided with a socket 53 for allowing the second shower portion 60 to be detached and plugged. The first waterway is connected to the first shower portion 50, the waterway inlet connector 18 is fixedly connected to the water diversion body, and the waterway inlet connector 18 is connected to the other waterway and the second shower portion. The waterway of the first water diversion 22 is connected to the first shower portion 50, the first shower portion 50 is a rain shower, other water diversion channel 22 is connected to the second shower portion 60. The second shower portion 60 is a hand-held shower.

A base 17 is fixedly disposed between the water diversion body 14 and the lower body 52. The base 17 is provided with a mounting space 171 corresponding to three buttons. The lower body 62 has through holes corresponding to three buttons. The buttons 31, 32 is provided with a protrusion ring that fits over the mounting space and is smaller than the through-hole area of the lower body 62 to prevent the button from being disengaged by the lower body.

In the specific structure, the fixed portion further includes a cover 16 provided with a through hole for the three buttons 31 and 32 to pass through. A convex seat 161 is protrusively provided on the rear surface of the cover 16. A slide groove is provided on the convex seat 161, the transmission member 33 is slidably connected to the slide groove so as to guide the transmission member to slide, a convex column is convexly arranged on the back surface of the cover 16, the inner hole of the sleeve 12 is matched with a pillar for sliding guiding of the sleeve The large diameter portion is provided with the above-described side portions on both sides of the pillar respectively. The base 17 and the cover 16 are fixed between the water diversion body 14 and the lower body 52. The slider 40 is slidably connected between the cover 16 and the base 17.

The foregoing descriptions are merely exemplary embodiments of the present invention, and therefore, should not be taken as limitations on the scope of the present invention, ie, equivalent changes and modifications based on the scope of the patent and the contents of the specification should be covered by the present invention Range.

The invention claimed is:

1. A multi-button waterway switching mechanism comprising a fixed portion provided with a waterway switching unit and a driving mechanism, the waterway switching unit comprises two valve cores movable relative to the fixed portion, the driving mechanism is provided with three buttons at intervals, the three buttons are divided into two first buttons and a second button, the two first buttons are respectively drivingly connected with the two valve cores, wherein comprising: the driving mechanism further comprises a transmission member, the second button is drivingly connected to the transmission member, the transmission member drivingly connected to the two valve cores.

2. The multi-button waterway switching mechanism according to claim 1, wherein comprising: the three buttons are arranged side by side and parallel to the sliding direction of the fixed portion.

3. The multi-button waterway switching mechanism according to claim 1, wherein comprising: the valve core is slidably connected with the fixed portion, and a first elastic body capable of resetting the valve core is provided between the valve core and the fixed portion; the first button and the valve core can be brought into abutting engagement to drive the abutted valve core to slide by the sliding of the first button; the transmission member is slidably connected with the fixed portion, the second button and the transmission member can be brought into abutting engagement to drives the transmission member to slide by the sliding of the second button, and the transmission member and the two valve cores can abut against each other to drive the two valve cores to slide synchronously by the sliding of the transmission member.

4. The multi-button waterway switching mechanism according to claim 1, wherein comprising: the two first buttons are respectively disposed on two sides of the second button, the transmission member has two abutting portions, and the two abutting portions respectively transmit two valve cores.

5. The multi-button waterway switching mechanism according to claim 1, wherein comprising: the valve core's sliding direction, the button's sliding direction and the transmission member's sliding direction are parallel to each other.

6. The multi-button waterway switching mechanism according to claim 1, wherein comprising: the fixed portion is provided with a waterway inlet and two water diversion channels respectively capable of connecting with the waterway inlet, and the two valve cores are respectively slidably connected to the two water diversion channels and controls the on-off between the water diversion channel and the waterway inlet by the sliding of the valve, the first end of the valve core also seals and slides out of the water diversion channel, the first elastomer is arranged between the second end of the valve core and the fixed portion for enabling the valve core to be reset.

7. The multi-button waterway switching mechanism according to claim 1, wherein comprising: the fixed portion is provided with a waterway inlet and two water diversion channel capable of respectively connecting to the waterway inlet, the two valve cores are respectively slidably connected to the two water diversion channel and controls the on-off between the water diversion channel and the waterway inlet by sliding of the valve core, the fixed portion is provided with two mounting holes respectively connected to the two water diversion channel, and the first end of the valve core also seals and is slidably connected to the mounting hole; the fixed portion is slidably connected with two sleeves which are stepped and have a large diameter portion and a small diameter portion, the small diameter portion can be inserted into the mounting hole and abuts against the first end of the valve core, the first button end and the large diameter portion can abut against each other, and the transmission member and the large diameter portion can abut against each other.

8. The multi-button waterway switching mechanism according to claim 7, wherein comprising: the two first buttons are respectively disposed on two sides of the second button, the transmission member has two abutting portions, and the two abutting portions respectively drive two valve cores; the large diameter portion has two side portions respectively located on both sides of the inner hole of the sleeve, and the first button and the abutting portion respectively abut against the two side portions.

9. The multi-button waterway switching mechanism according to claim 1, wherein comprising: further comprising a slider and a second elastic body, the slider can move relative to the fixed portion between the locking position and the releasing position, the slider's sliding direction and the button's sliding direction is arranged vertically, the second elastic body is connected to the fixed portion and the slider so that the slider can be subjected to the elastic force from the release position toward the locking position; the slider is provided with three through holes, the three buttons respectively pass through the three through holes; each of the buttons is provided with a first protrusion, the back surface of the first protrusion is a first guide surface, and the first guide surface and the slider are matched so that the slider can be driven to slide to the unlocking direction when the button is pressed, and the front surface of the first protrusion forms a locking surface capable of pressing against the slider to keep the button in the pressed state.

10. The multi-button waterway switching mechanism according to claim 9, wherein comprising: each of the buttons is provided with a second protrusion, and the second protrusion and the first protrusion are arranged in the front and back direction of the button, the back surface of the second protrusion is a second guiding surface, the second guiding surface cooperates with the slider so that when the button is pressed, the slider can be driven to slide to the unlocking direction.

11. The multi-button waterway switching mechanism according to claim 10, wherein comprising: the distance of the second guide surface along the sliding direction of the slider is greater than the distance of the first guide surface along the sliding direction of the slider.

* * * * *